United States Patent [19]

Koosha

[11] 4,433,824

[45] Feb. 28, 1984

[54] VIDEO PROJECTOR ADJUSTABLE SUPPORT

[75] Inventor: Mansour Koosha, Endwell, N.Y.

[73] Assignee: The Singer Company, Binghamton, N.Y.

[21] Appl. No.: 220,585

[22] Filed: Dec. 29, 1980

[51] Int. Cl.³ .............................................. F16M 1/00
[52] U.S. Cl. .................................. 248/662; 248/188.4
[58] Field of Search .............. 248/660, 662, 663, 661, 248/667, 657, 652, 188.4, 649, 650, ; 353/5; 434/44, 43; 358/104

[56] References Cited

U.S. PATENT DOCUMENTS

| | | | |
|---|---|---|---|
| 1,211,352 | 1/1917 | Rathburn | 248/657 |
| 3,356,324 | 12/1967 | Attermeyer | 248/650 |
| 3,361,410 | 1/1968 | Messer | 248/188.4 UX |
| 3,705,377 | 12/1972 | Hansen | 211/26 X |
| 3,971,537 | 7/1976 | Winkle | 248/188.4 X |
| 4,185,913 | 1/1980 | Ammann | 248/662 X |

FOREIGN PATENT DOCUMENTS 2218164 11/1972 Fed. Rep. of Germany ...... 248/178

*Primary Examiner*—J. Franklin Foss

*Attorney, Agent, or Firm*—Douglas M. Clarkson; Jeff Rothenberg

[57] ABSTRACT

Alignment and adjustable support structure for video projector is disclosed. The support structure includes the base plate 16 and at least three apertures for receiving three jack screws 22, 24 and 26. The jack screws have a length greater than the selected thickness of the base plate such that the base plate can be adjusted with respect to a post plate 28. Each of the jack screws includes an aperture 72 therethrough along its longitudinal axis. Post plate 28 includes at least three apertures such as aperture 68 for receiving a fastening means 70 which extends through aperture 68 and through aperture 72 of jack screw 26. Fastening means 70 is suitable for securing the post plate 28 in a selected position with respect to base plate 16 as is determined by the allowable motion of jack screw 26. A rolling plate 30 includes a top surface for receiving the bottom surface of post plate 38. The bottom surface of rolling plate 30 includes guideways 94 and 98 suitable for receiving a pair of parallel guides 96 and 100 such that the combination roller plate 30, post plate 28 and base plate 16 may be moved in a desired direction. There also is included a pin 102 for securing roller plate 30 to post plate 28.

6 Claims, 7 Drawing Figures

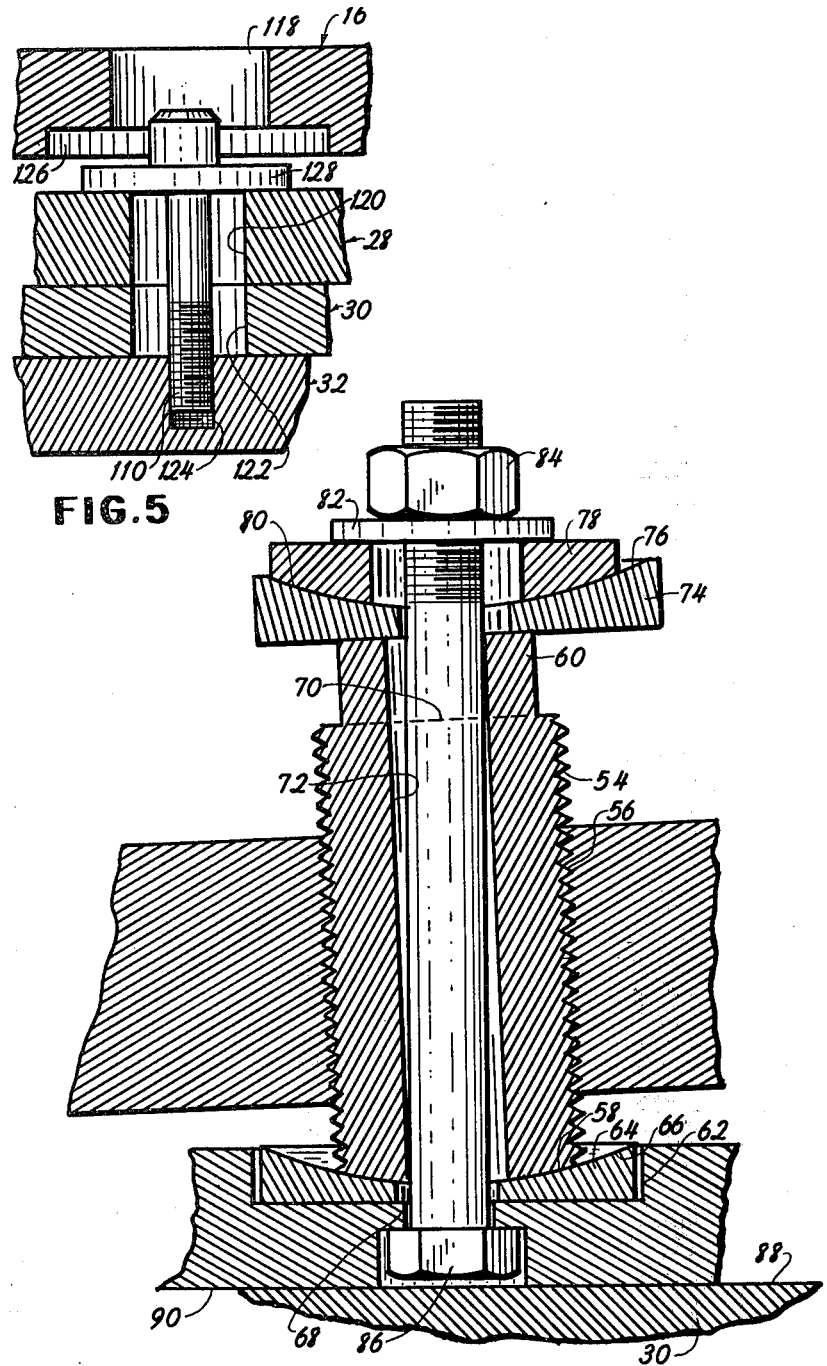

VIDEO PROJECTOR ADJUSTABLE SUPPORT

GOVERNMENT LICENSE

The government has rights in this invention pursuant to Contract No. F33657-78-C-0592 awarded by the Department of Air Force.

DESCRIPTION

1. Technical Field

This invention relates generally to visual systems for vehicular simulators and more particularly to support means for a video projector having adjustments such that the video projector can be easily aligned. By means of support means, the video projector is able to be readily moved for maintenance purposes and then returned to its original position while maintaining the precise alignment. More particularly, this support apparatus uses three jack screws to provide precise position alignment to a video projector, and also uses guide rails to allow movement of the projector out of position for maintenance. Once the maintenance is completed, the projector can then be returned to its precise position for operation without alignment.

2. Background Art

There are various types of scene generation systems which are used with modern vehicular or aircraft simulators and which include motion film projection systems, camera model systems, and digital image generation systems. However, experience has shown that the more acceptable systems used today include camera model systems such as described in U.S. Pat. Nos. 2,975,671; 3,643,345; 3,670,426; and 3,961,133. Another acceptable visual generation system for use with today's modern aircraft simulators is one that produces a computer generated system such as those systems described in U.S. Pat. Nos. 3,621,214; 3,826,864; and 3,961,133.

Although the camera model system and the computer generating system creates or generate its visual scenes by entirely different techniques, both of these systems may use one or more CRT's (cathode ray tubes) for presentation of the desired visual scene. In certain of these type systems, the CRT's are viewed directly, whereas in other systems the CRT's are viewed by means of optics such as beam splitters and/or mirrors. However, for certain types of applications, it has been found that the scene can better be viewed in certain simulation situations if the scene is projected onto a large panoramic or dome shaped screen. For these purposes, CRT projectors and laser projector displays are particularly useful.

In simulator systems which use video projectors, whether the projector be CRT projectors, laser projectors or other types of projectors, it is not unusual that the visual system use more than one projector. For example, in certain visual systems of modern aircraft simulators, up to eight video projectors may be used at one time to provide the complete visual scene. Since the eight projectors must be accurately synchronized such that a single presentation or visual scene is presented, it will be appreciated that the alignment and adjustment of the eight video projectors is critical. Unfortunately, it is also often necessary to provide maintenance to the visual system wherein movement of the video projectors is required. In these instances, it will be appreciated that the careful alignment may be destroyed and then have to be reaccomplished. Further, since these adjustments may be required for both roll and pitch, the task is, of course, made more difficult. However, since it is desirable in any such training situation, that a real flight be simulated, it is essential that this alignment take place.

Therefore, it is an object of the present invention to provide a simple and inexpensive technique for supporting a video projector which allows movement for purposes of maintenance, such that the projector can then be returned to its original position without requiring realignment.

It is still another object of this invention to provide a support means for a video projector which simplifies the alignment and adjustment procedure.

DISCLOSURE OF THE INVENTION

Other objects and advantages will in part be obvious, and will in part appear hereinafter, and will be accomplished by the present invention which provides alignment and adjustable support structure for a video projector. The support structure comprises a means for rigidly securing the video projector to a base plate. The base plate is of a selected shape and thickness, and has a top and bottom parallel surface. Included in the base plate are at least three jack screws, each of which has a length greater than the thickness of the base plate such that the jack screws extend through the base plate so that the base plate can be adjusted with respect to a post plate. Each of the jack screws includes an aperture through the jack screw along its longitudinal axis. A post plate having a selected shape such as the shape of the base plate also has top and bottom parallel surfaces, and includes at least three apertures between the top and bottom surfaces which are suitable for receiving a fastening means which has a diameter smaller than the diameter of the longitudinal aperture through the jack screws. The longitudinal axis of these apertures through the post plate are perpendicular to the top and bottom parallel surfaces of the post plate, and are in register with the longitudinal axis of the apertures through the jack screws which are mounted within the base plate. Fastening means extend through the aperture in the post plate, and through the aperture in the jack screw for securing the post plate in a selected position with respect to the base plate as determined by the adjustments of the jack screws. A roller plate also having a selected shape, along with top and bottom parallel surfaces, supports the bottom surface of the post plate. The bottom surface of the rolling plate includes a pair of parallel guides such that the roller plate may be moved along a pair of parallel rails. Also included are means for securing the roller plate to the post plate and guide rails for supporting the roller plate.

BRIEF DESCRIPTION OF THE DRAWINGS

FIG. 4 is an enlarged view of the jack screw used and featured in this invention.

FIG. 5 is an enlarged view of the bolting arrangement for securing the post plate to the roller plate.

BEST MODE FOR CARRYING OUT THE INVENTION

Figure 1:
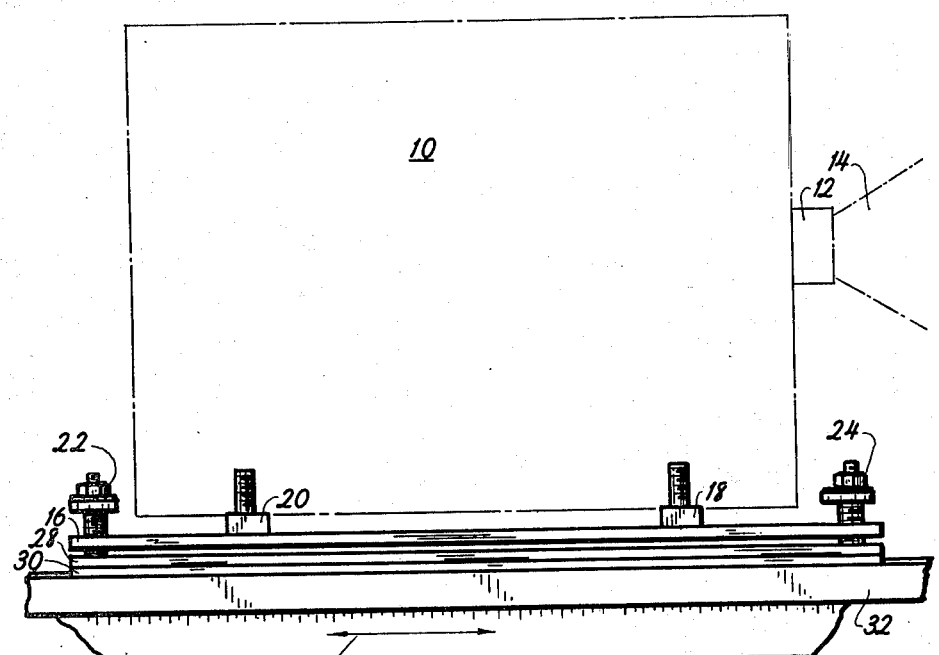
FIG. 1 is a side view of the support structure of this invention and a video projector supported thereon.

Referring now to FIG. 1, there is shown a side view of a video projector and the adjustable support structure of this invention. As shown, there is included a video projector 10 having a projection lens 12 suitable for projecting light as indicated at 14. Projector 10 is mounted to a base plate 16 by means of insulation blocks 18 and 20. Base plate 16 is in turn mounted by a series of jack screws. In a preferred embodiment, a single jack screw 22 is mounted at the rear and two jack screws, such as jack screw 24, are mounted at the front. Front jack screw 26 is not seen in FIG. 1 but can readily be seen in FIG. 2. Jack screws 22, 24 and 26 support base plate 16 above post plate 28. Post plate 28 is in turn securely mounted, bolted and/or pinned to roll plate 30. Roll plate 30 sets on a support plate 32 which as will be discussed hereinafter includes rails such that roll plate 30 can be moved back and forth in the direction indicated by arrow 34 when desired.

Thus, it can be seen that there is provided a means for supporting video projector 10 which allows movement of the projector in at least one direction. Further, it is important that projector 10 have the capability to be moved out of its operating position for necessary maintenance and the like, and then returned to its operating position. In addition, this return to the operating position should be accomplished without the need of any further adjustments or alignments of the projector.

Figure 2:
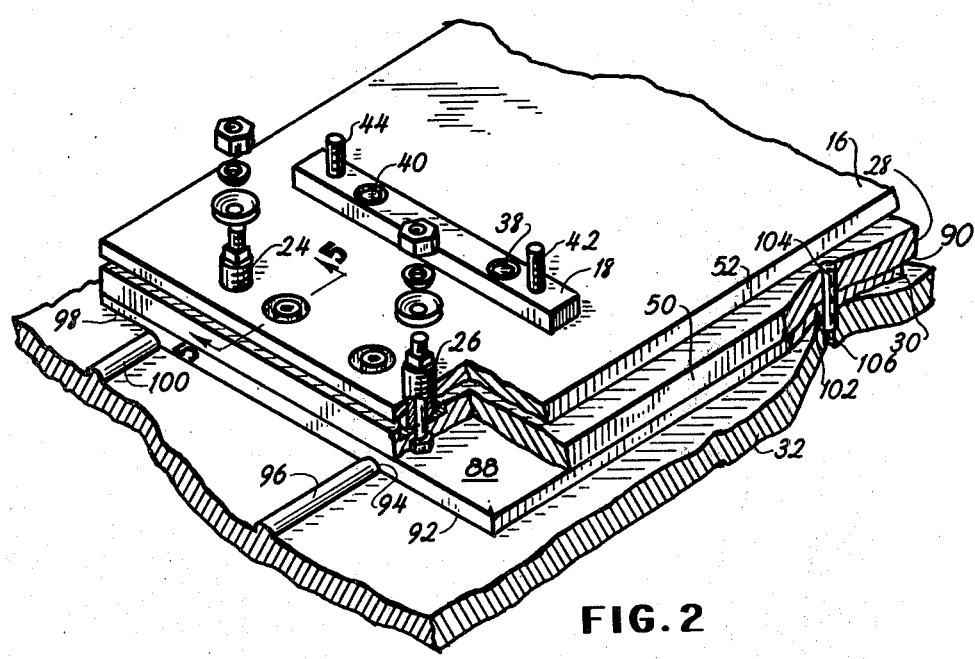
FIG. 2 is a perspective or pictorial view of the support structure incorporating the feature of this invention.
Figure 3:
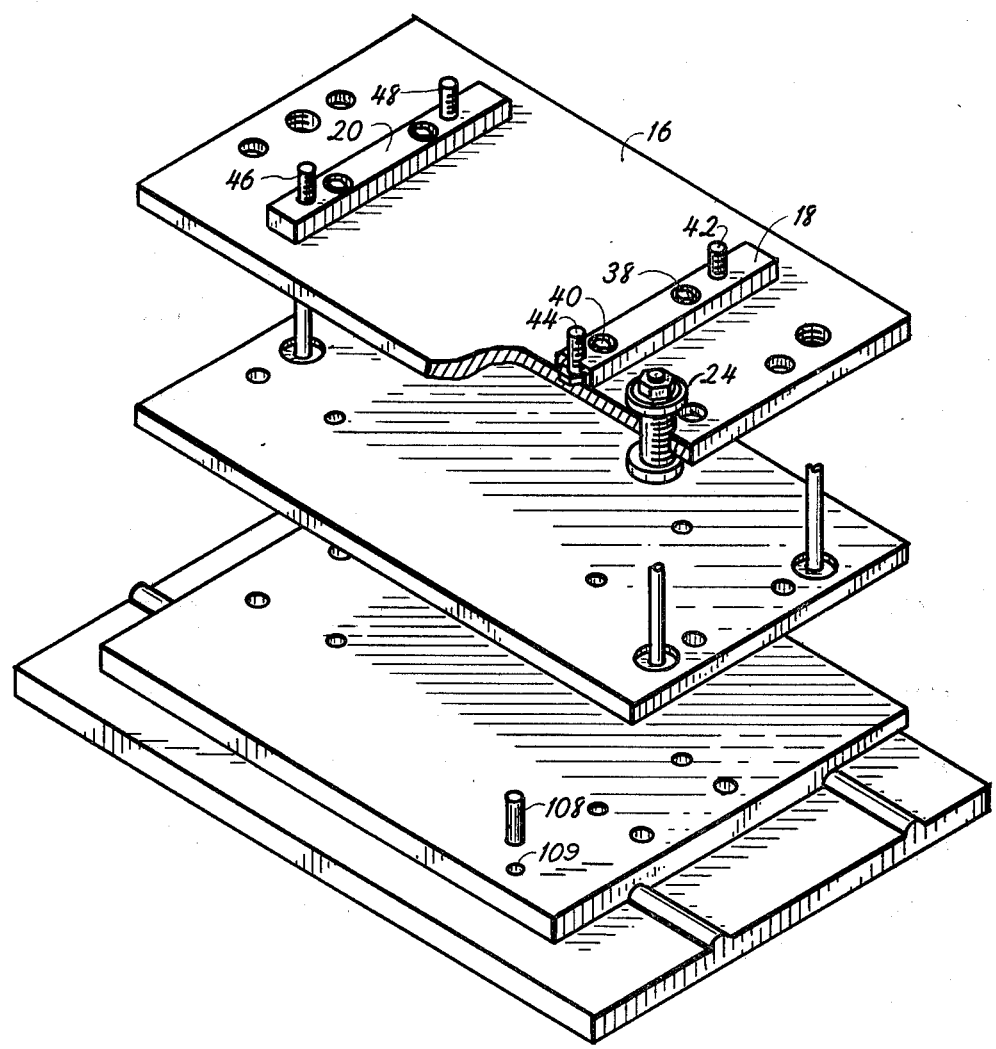
FIG. 3 is an exploded view of the support structure shown in FIG. 2.

Referring now to the perspective partially cross-sectional view of FIG. 2 and the exploded view of FIG. 3, the operation of the present invention can be seen. As shown, projector 10, not shown in FIG. 2 or 3, mounts to a pair of insulation blocks 18 and 20. Insulation blocks 18 and 20 are preferably paper base phenolic blocks which are bolted directly to base plate 16 by means of counter sunk bolts such as shown at 38 and 40 of FIG. 2 which mount insulation block 18 to the front portion of base plate 16. Insulation blocks 18 and 20 further include counter sunk bolts for mounting the projector in an insulated manner. For example, as shown, counter sunk bolts 42 and 44 go through insulation block 18 and mount to projector 10 whereas bolts 46 and 48 go through insulation block 20 and mount to projector 10. Thus, it can be seen, that the projector by means of the insulation blocks 18 and 20 is securely mounted to base plate 16.

As will be appreciated, of course, the material from which base plate 16 is made and its particular size may, of course, vary with the application and the size and weight of the projector which it supports. However, for most operations, it has been found that an aluminum plate provides the necessary rigidity and support.

As was discussed heretofore, base plate 16 is itself mounted by means of at least three jack screws such as jack screws 22, 24 and 26 to post plate 28. Post plate 28 may also be made of aluminum plate and is substantially the same size as the base plate, except as shown in the embodiment of FIG. 2, the edge 50 of post plate 28 extends beyond edge 52 of base plate 16. Whereas FIG. 3 shows base plate 16 and post plate 28 as being substantially the same size, and roll plate 30 extending beyond both. As was mentioned, although more than three jack screws may be used, the necessary adjustment may be achieved by three jack screws. As is well known, three points are required to describe a plane. Thus, by operation of the three jack screws, the relationship of base plate 16 to post plate 28 can be varied as desired within the limits allowed by the jack screws.

Referring now to FIG. 4, there is shown an enlarged view of a jack screw such as jack screw 22, 24 or 26. As can be seen, from the FIGS. 2, 3 and 4, jack screw 26 has threads 54 which are threaded into base plate 16 having matching threads 56. Jack screw 26 includes a bottom convex surface 58 and a flat top surface with a square or hexagon portion 60 which portion is suitable for receiving a wrench for adjustment. Thus, it can be seen that by placing a wrench on the squared or hexagon shoulder 60, and turning the jack screw 26 the longitudinal position of jack screw 26 can be adjusted with respect to its position in base plate 16. As is further shown, post plate 28 includes an enlarged cut out 62 for receiving a concave washer 64. The concave surface 66 of washer 64 is suitable for matching the convex surface 58 of jack screw 26. Post plate 28 further includes an aperture 68 therethrough for carrying a bolt 70. Bolt 70 extends through the aperture 68 of post plate 28 and through the tubular aperture 72 of jack screw 26. As can be seen by the enlarged view of FIG. 4, the tubular aperture 72 has a substantially larger diameter than the diameter of bolt 70. This allows pivoting or movement of jack screw 26 with respect to bolt 70. Thus, it can be seen that by proper adjustment of the three jack screws 22, 24 and 26 as shown in FIG. 3, the position of base plate 16 to post plate 28 can be adjusted to any desired alignment within the limit of movement allowed by the jack screws. However, once the adjustment is completed it must be secured in position to avoid shifting. Therefore, referring again to the enlarged view, FIG. 4, of jack screw 26 there is shown a second concave washer 74 having a concave surface 76. Also shown, is a washer 78 having a convex surface 80 which matches with the convex surface 76 of washer 74. In addition, there is shown a washer 82 and a nut 84 for securing the position of base plate 16 to post plate 28 by securing the jack screws in position. It will be appreciated that by use of the convex and concave surfaces of washers 74 and 80, even though the jack screw may be moved to its extreme limits, there is still sufficient mating surfaces such that the entire assembly can be held securely in position. Post plate 28 rests flatly on roller plate 30, and referring again to the enlarged view of the jack screws shown in FIG. 4, it can be seen that bolt 70 is counter sunk into post plate 28 such that the head 86 of bolt 70 does not touch the surface 88 of roller plate 30.

Referring now to FIGS. 2 and 3, it can be seen that the top flat surface 88 of roller plate 30 matches with the bottom flat surface 90 of post plate 28. Roller plate 30 also includes a bottom surface 92. As shown in FIGS. 2 and 3, bottom surface 92 includes a first groove 94 for receiving a rail 96 and a second open groove 98 for receiving a second rail 100. Roll plate 30 may also include an aperture such as aperture 102 for receiving a locking pin 104. In the embodiment shown in FIG. 2, post plate 28 and roller plate 30 are substantially the same size whereas base plate 16 is slightly smaller and locking pin 104 extends through both post plate 28, rolling plate 30, and into a receiving aperture 106 in a support plate 32. Alternately, as can be seen in FIG. 3, base plate 16 and post plate 28 are substantially the same size and roller plate 30 is slightly larger. In this embodiment, pin 108 passes through aperture 109 of roller plate 30 into aperture (not shown) of support or mounting plate 32. It will also be appreciated, of course, that there may be more than one pin. Consequently, although not shown, the mounting plate 32 is itself mounted to sufficient structure for supporting the entire assembly.

As shown in FIG. 3, post plate 28 (base plate 16 as mounted thereon) may be secured to roller plate 30 by means of one or more bolts such as bolts 110, 112, 114 and 116. Referring now to FIGS. 2 and 5, there is shown the details of this securing technique. As shown bolt 110 may be accessed by means of a clearance hole 118 in base plate 16. Bolt 110 passes through hole 120 in post plate 28, hole 122 in roller plate 30 and is received by tapped hole 124 in support plate 32. FIG. 5 also shows that in addition to clearance hole 18, base plate 16 may also include a cutout 126 to receive washer 128.

Thus, it will be appreciated that by simply removing the locking pin such as pin 104 in FIG. 2 or pin 108 in FIG. 3, the entire support structure including rolling plate 30, post plate 28, support plate 16, and phenolic insulation block 18 and 20 which carry projector 10 may be rolled out of the way for any necessary maintenance. Once such maintenance is complete the entire structure is rolled back in place as determined by guide rails 96 and 100 and the locking pins replaced. It can further be seen that by use of such structure, that once the necessary alignment is made for the projector by means of adjusting the jack screws 22, 24 and 26, no further adjustments will be necessary for aligning the projector even when it is moved out of the way for maintenance and then returned to its original position.

Figure 6:
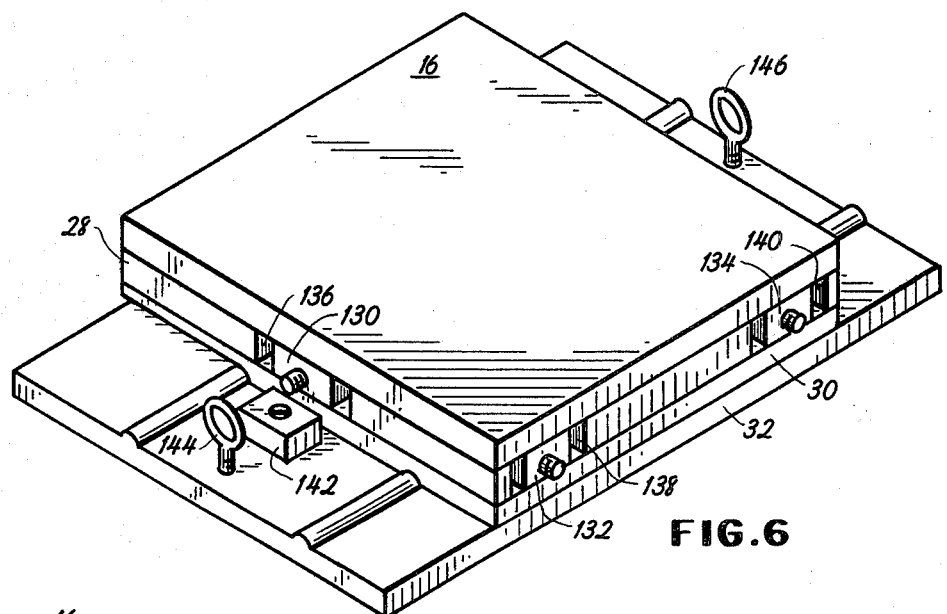
FIG. 6 is a perspective view of an alternate embodiment employing set screw assemblies for adjusting the post plate with respect to the roller plate.
Figure 7:
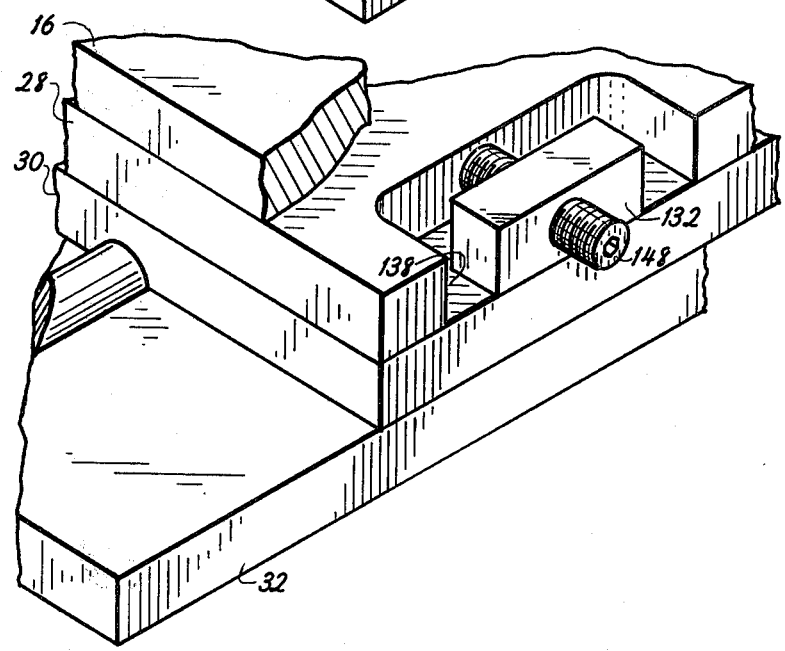
FIG. 7 is an enlarged and cut away view of a set screw assembly.

Referring now to FIGS. 6 and 7, there is shown an alternate embodiment to the use of locking pin 108 of FIG. 3 which also allows for more precise alignment. According to the embodiment of FIGS. 6 and 7, the base plate 16, post plate 28, and roller plate 30 have the same length and width, except roller plate 30 includes six set screw assemblies such as assemblies 130, 132 and 134 mounted around the edges of the surface of roller plate 30. These set screw assemblies cooperate with cutouts 136, 138 and 140 respectively in post plate 28 for precision horizontal alignment. The rear set screw assembly and two set screw assemblies on the opposite side are now shown. Also as is shown, locking pin 108 is not used, and instead there is included stop block 142 mounted to support plate 32. For purposes of lifting the whole assembly eye bolts 144 and 146 may be included. As shown in the cutaway view by FIG. 7, set screw assembly 132 is securely, mounted to roller plate 30 such that by adjusting set screw 148, the horizontal location of post plate 28 with respect to roller plate 30 can be varied. It will be appreciated, of course, that set screw assembly 130, and 134 shown in the drawing, as well as the three assemblies not shown, all operate in the same manner as set screw assembly 132.

Thus, although the present invention has been described with respect to specific apparatus for providing adjustable support structure for a video projector, it is not intended that such specific references be considered limitations upon the scope of this invention except insofar as is set forth in the following claims.

I claim:

1. Alignment and adjustable support structure for a video projector which permits movement of said video projector out of a precisely aligned position and return without requiring realignment or readjustment, comprising:

a base plate having a first selected shape, a selected thickness, and top and bottom parallel surfaces, said base plate including at least three jack screws having a length greater than said selected thickness for adjusting said base plate relative to a post plate, and each of said jack screws defining an aperture having a first diameter through the longitudinal axis;

means for rigidly securing said video projector to said base plate;

said post plate having a second selected shape, and top and bottom parallel surfaces, said post plate further defining at least three apertures between said top and bottom surfaces of said post plate, said apertures suitable for allowing a fastening means having a diameter smaller than said diameter of said longitudinal aperture of said jack screw to extend therethrough, said longitudinal axis of said apertures through said post plate being perpendicular to said top and bottom parallel surfaces of said post plate, and in register with the longitudinal axis of said apertures through said jack screws;

fastening means extending through said aperture in said post plate and said apertures in said jack screws in register therewith for securing said post plate in a selected position relative to said base plate as determined by said jack screws;

a rolling plate having a selected shape, and top and bottom parallel surfaces, said top surface for supporting said bottom surface of said post plate, said bottom surface of said rolling plate defining a pair of parallel guides such that said rolling plate may be moved along a pair of parallel rails;

means for securing said rolling plate to said post plate; and guide rails for supporting said rolling plate;

so that said video projector is movable out of an aligned and adjusted position and is returnable without requiring a change in alignment or adjustment.

2. The apparatus of claim 1 wherein each of said jack screws includes a bottom convex portion and further including a bottom washer having a concave surface suitable for providing a contact surface with said bottom convex portion of said jack screw, and said post plate defining a depression in register with each of said apertures therethrough for receiving said bottom washer.

3. The apparatus of claims 1 or 2 wherein said fastening means extending through said post plate and said jack screws is a bolt secured by a nut.

4. The apparatus of claim 3 and further including a first top washer having one concave surface and one flat surface and a second top washer having a convex surface and a flat surface, said first and second washers being located around said bolt extending through said jack screw, and between said jack screw and said nut, and positioned with respect to each other so that the convex surface of said second washer mates with the concave surface of said first washer.

5. The apparatus of claims 1 or 2 and further including means for electrically insulating said projector from said base plate.

6. The apparatus of claim 4 and further including means for electrically insulating said projector from said base plate.

* * * * *